May 29, 1928.
L. KUHL
1,671,531
REFRIGERATING APPARATUS
Filed March 26, 1928
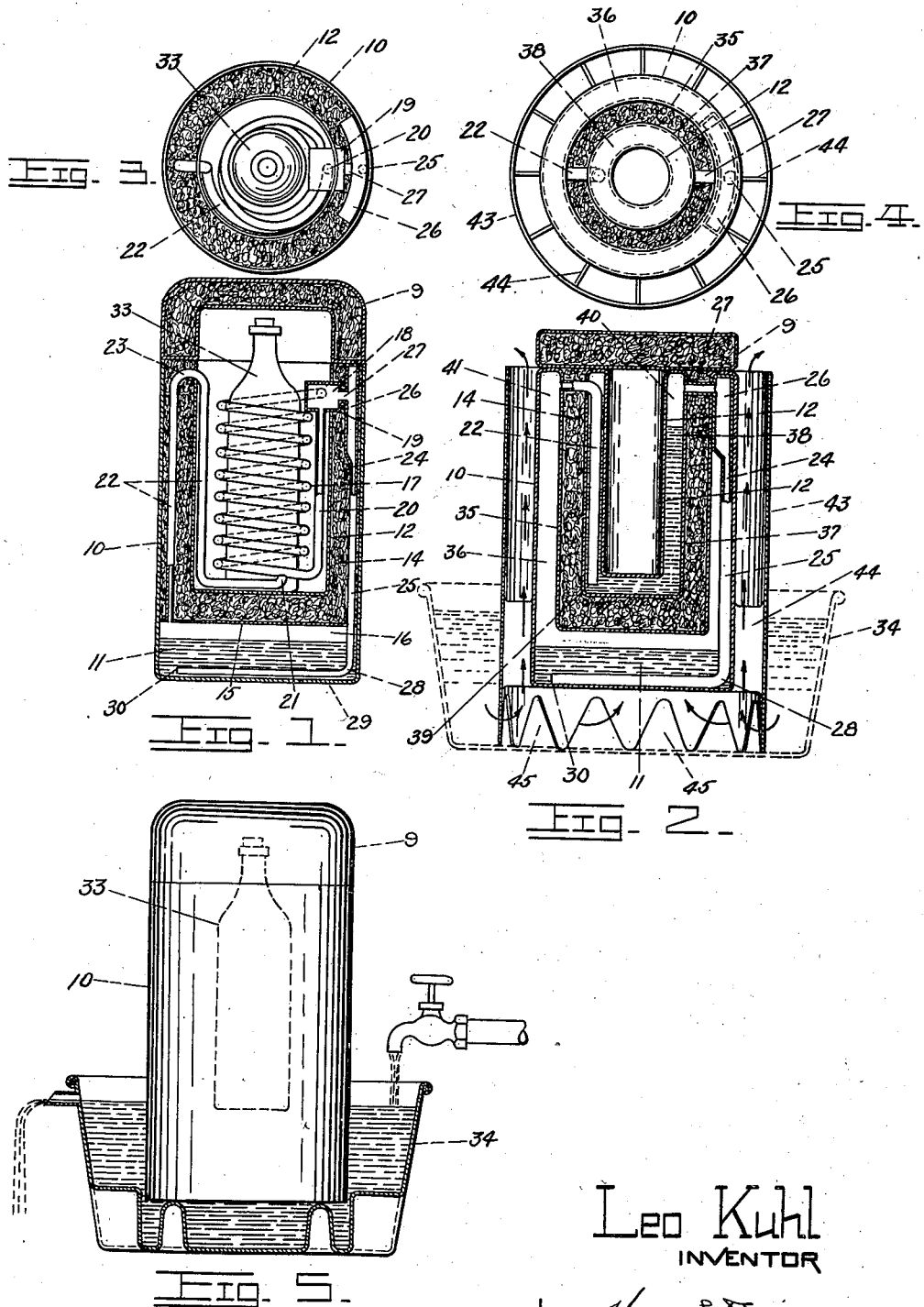
Leo Kuhl
INVENTOR
by Harry S. Demaree
ATTORNEY Patented May 29, 1928.

1,671,531

UNITED STATES PATENT OFFICE.

LEO KUHL, OF BERLIN-CHARLOTTENBURG, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY.

REFRIGERATING APPARATUS.

Application filed March 26, 1926, Serial No. 264,618, and in Germany November 14, 1924.

I have filed an application in Germany, on November 14, 1924, Patent No. 447,542.

This invention relates to a refrigerating apparatus.

The primary object of this invention is to provide a refrigerating apparatus which is suitable for household use, for cooling eatables, drinks and the like. Of course, it will be obvious that the same constructional arrangement might be utilized in other devices and for other purposes.

Other objects and particular features of this invention will appear from the following description taken in connection with the accompanying drawings, in which similar numerals refer to similar parts throughout the several views.

Figure 1 is a vertical sectional view of a device representing one form of my invention;

Fig. 2 represents a modified form of my invention;

Fig. 3 is a plan view of Fig. 1, the cover being removed;

Fig. 4 is a plan view of Fig. 2, the cover being removed;

Fig. 5 is an elevation drawing of the device shown in Fig. 1 in connection with a cooling means for the binary mixture during the refrigerating period.

With reference to the drawing, which is a more or less diagrammatic illustration of this invention, attention is first directed to Fig. 1 in which 10 represents a cylindrical vessel which carries a solution of water and ammonia or other suitable binary mixture indicated by 11. A smaller cylindrical vessel 12 is nested and enclosed therein and the space between said vessels is filled with a heat insulating material 14 of any suitable character. A partition 15 is arranged in the lower end of vessel 10 to form a hermetically sealed chamber 16 for said binary mixture.

A coil of pipe 17 is arranged within the heat insulated vessel 12 and serves alternately as a condenser and evaporator for the refrigerant as will hereinafter more fully appear. The upper end of pipe coil 17 communicates with a chamber 18, preferably at some distance above the bottom thereof, said chamber being formed of the casing 19 which in effect serves as a trap for the refrigerant when in the liquid state. The lower end of pipe coil 17 leads upwards as shown at 20 and enters the chamber 18 preferably at the bottom thereof.

Connected to the lower end of the pipe coil 17 as shown at 21 is a pipe 22 which leads upward to a point above the upper end of pipe coil 17 as shown and there takes a U bend as at 23 and leads downward and communicates with the binary mixture chamber 16 through the partition wall 15.

A conduit 24 formed by the pipe 25, and preferably of large volume at the upper end thereof as shown at 26, and at which point communication therewith is formed with the chamber 18 through a short pipe connection 27, leads downward through the partition wall 15 into the binary mixture chamber 16 and takes a right-angle bend at 28 and extends diametrically across the vessel 10 and rests upon the bottom 29 thereof. The conduit 24 thus communicates with said chamber 16 through the open end of the pipe 25 at the end 30 thereof. A lid 9 is provided for closing the inner vessel 12.

The entire system comprising the chamber 16, pipe 22, pipe 20, pipe coil 17, chamber 18, pipe 27 and conduit 24 should be hermetically sealed to prevent leakage of the binary mixture or other refrigerant. Obviously, some suitable opening leading into this system may be provided for introducing the binary mixture, but such opening must be provided with a gas-tight closure.

The operation of this device is as follows:—

A binary mixture, for instance, water and ammonia, of suitable proportions is carried in the chamber 16 and the device is set upon a gas burner or other heat producing device which causes the refrigerant portion, or ammonia, to be distilled therefrom and which passes up and then down through the pipe 22 and into the pipe coil 17, where it condenses into a liquid, the pipe coil 17, of course, always being sufficiently cool to cause said condensation, particularly because it is heat insulated from the chamber 16 through the heat insulating material 14. The casing 12 may be filled with cold water to condense the refrigerant distilled over. After practically all of the refrigerant substance has passed over into the pipe coil 17 and condensed therein, the device is removed from the gas burner and is now ready to function as a refrigerator. The article which is desired to be cooled, in this instance represented by a bottle 33 which may contain a beverage or the like, is placed within the coils of pipe coil 17 as shown. It is now necessary to maintain a moderately low temperature in the chamber 16 and this may be accomplished by placing the device in a pan 34 containing water as shown in Fig. 5. While in this condition the ammonia or refrigerant in the pipe coil 17 naturally vaporizes and expands, thereby absorbing heat units within the vessel 12 and greatly reducing the temperature therein, and passes through chamber 18, pipe 27, conduit 24 and into the base solution or water portion of the binary mixture 11 and is thereby absorbed. This action continues automatically until practically all the refrigerant substance in the pipe coil 17 has passed over and is absorbed by said base solution when the operation of heating the binary mixture must be repeated. It is obvious that during the refrigerating period, the rate of evaporization of the refrigerant in the pipe coil 17 will be more or less rapid according to the temperature maintained in the chamber 16, therefore, it may be preferable to maintain a constant circulation of water through the pan 34 to keep down the temperature thereof and accordingly obtain a lower temperature in the vessel 12.

If for any reason the refrigerant in its liquid state should enter the chamber 18 it will drain back into the pipe coil 17 through the pipe 20 while any gas or vapor thereof may pass on through the conduit 24. In this manner the chamber 18 serves as a trap.

During the heating or distilling operation of the binary mixture, a certain amount of the base or water portion thereof may pass over into the pipe coil 17 in the form of steam and there condense, and as this portion would not naturally return to the chamber 16, occasion may arise when it will be necessary to free the pipe coil 17 from such solution. This may be accomplished by turning the device practically up-side-down allowing all of the solution to settle in the large portion 26 of the conduit 24, and then appropriately turning the device to its upright position to cause all the solution to drain into the chamber 16 through the conduit 24.

A modification of this invention is shown in Fig. 2. Here the vessel 10 is provided with an inner casing 35 to form a chamber 36 which extends to the very top of the device. The vessel 12 is surrounded by a casing 37 to form a chamber 38 which also extends to the very top of the device. The pipe 22 in this construction communicates with the upper end of the chamber 36 and leads through the wall of casing 37 and then downward within the chamber 38 and opens at a point 39 close to the bottom thereof. The conduit 24 in this construction is substantially the same as that shown in Fig. 1 and is in open communication with the chamber 38 through the pipe connection 27. In this modification the chamber 38 is an equivalent of the chamber formed by pipe coil 17 in Fig. 1, and obviously the operation of this device is the same as that described with reference to Fig. 1. However, in this modification there is no casing 19 to form a trap or chamber 18, as this feature is embodied within the chamber 38, for due to the large volume 40 above the surface of the refrigerant there is no possibility of the refrigerant in its liquid state passing through the pipe connection 27 into conduit 24 in such quantities as to materially reduce the efficiency of the device; and further, there is little possibility of water or any of the base portion of the binary mixture entering the condensing chamber 38 on account of the large volume 41 in chamber 36 above the surface of the binary mixture; and practically all of the base portion of the binary mixture which rises to the upper region of the chamber 36 in the form of steam will promptly condense before passing through the pipe 22 into the chamber 38. However, if any of the water or base portion of the binary mixture should pass into the chamber 38 it can be returned by manipulating the device in the same fashion as described with reference to the device in Fig. 1.

A further modification comprising an air-cooling device is shown in connection with Fig. 2. Here an outer cylindrical casing 43 surrounds the vessel 10 and is fixed thereto through fins 44. The lower edge of the casing 43 is scalloped as shown at 45 to provide openings for air circulation as indicated by the small arrows. Large surface area is provided by the fins 44 to facilitate the rapid conduction of heat either from or to the binary mixture in chamber 16, as the case may be, when either heating or cooling said binary mixture. This device might also be submerged partially in water for cooling the binary mixture, as indicated by the pan 34 and water shown in light broken lines in this figure; however, this is not considered necessary except to obtain a very low temperature in the vessel 12.

Having thus described my invention, what I claim as new and desire to secure by United States Letters Patent is as follows.

I claim:—

1. A refrigerating apparatus comprising an inner and an outer vessel, a partition arranged to form a binary mixture chamber at the bottom of said outer vessel, heat insulating material between the walls of said inner vessel and said partition and the walls of said outer vessel, there being a chamber within said outer vessel to serve alternately as a condenser and evaporator for the refrigerant portion of said binary mixture and at least a portion of the wall of said outer vessel being in direct connection with the interior of said inner vessel, a pipe forming open communication between said condenser and evaporator chamber and said binary mixture chamber, said pipe being arranged to open into said binary mixture chamber at a point above the binary mixture level and extend upward to a point above said condenser and evaporator chamber before opening thereinto, and a second pipe forming open communication between said condenser and evaporator chamber and said binary mixture chamber, said second pipe arranged to open into said condenser and evaporator chamber near the upper end thereof and extend downward and open into said binary mixture chamber at a point below the surface of the binary mixture.

2. A refrigerating apparatus, comprising an inner casing forming a condenser and evaporator chamber and an outer casing forming a generating chamber, said casings being in nested relation and the bottoms of said casings being spaced from each other to form a binary mixture chamber, a pipe opening at one end into said mixture chamber below the liquid level therein, and a pipe having one end connected to the top of said mixture chamber and its other end extending into said inner casing and in communication with the upper end of said first pipe.

3. A refrigerating apparatus, comprising an inner casing and an outer casing, said casings being in nested relation and the bottoms of the casings being spaced from each other to form a binary mixture chamber, a pipe coiled within said inner casing and having its lower end connected to the top of said mixture chamber, and a pipe having one end connected to said mixture chamber adjacent the bottom thereof and its other end communicating with the upper end of said coiled pipe.

Signed at Berlin-Siemensstadt, in the Republic of Germany, this 5th day of March, A. D. 1928.

LEO KUHL.